Aug. 4, 1959

E. UNGRICHT 2,898,039

CONSTANT FACTOR STORAGE MECHANISM FOR
A CALCULATING MACHINE

Filed Nov. 23, 1954

United States Patent Office 2,898,039
Patented Aug. 4, 1959

2,898,039
CONSTANT FACTOR STORAGE MECHANISM FOR A CALCULATING MACHINE

Emil Ungricht, Dietikon, Switzerland, assignor to Friden, Inc., a corporation of California Application November 23, 1954, Serial No. 470,725

Claims priority, application Switzerland June 9, 1954

10 Claims. (Cl. 235—79)

This invention relates to calculating machines, and more particularly to a constant factor storage mechanism for a calculating machine having a full keyboard and Thomas-type actuating mechanism, such as the calculating machine disclosed in Patent No. 2,229,889 granted January 28, 1941, to Carl M. F. Friden.

It is among the objects of the invention to provide an improved calculating machine assembly including selection mechanism and a storage mechanism which can be set by the selection mechanism to a selected value and will retain the selected value and re-enter it into the selection mechanism as a constant factor value whenever desired; in which the selected value can be released from the storage mechanism and a new value entered therein whenever desired; in which the storage mechanism is entirely independent of the selection mechanism, except when receiving a value to be stored therein or when re-entering a stored or constant factor value into the selection mechanism, and does not interfere in any way with the normal use of the selection mechanism; in which the storage mechanism is manually operable to receive a selected value and to re-enter the selected value into the selection mechanism as a constant factor value; and in which the storage mechanism may be provided substantially as a unitary assembly and may be installed in an existing calculating machine with no material modification of the calculating machine construction.

Other objects and advantages will become apparent from a consideration of the following description and the appended claims in conjunction with the accompanying drawings wherein:

With continued reference to the drawings, only such parts of the calculating machine are illustrated as are necessary to fully explain the construction and operation of the constant factor storage mechanism of the present invention, such parts including transverse members 10, 11 and 12 of the calculating machine frame. The selection mechanism of the calculating machine is illustrated and includes a full key keyboard, generally indicated at 14, a set of selection slides, generally indicated at 15, a set of square shafts, generally indicated at 16, selection gears, as indicated at 17, slidably mounted on the square shafts 16 and a set of actuator shafts 18. Each actuator shaft 18 of the machine carries stepped actuating drums 19 and 20 and is driven from a main drive shaft 21 through miter gear connections 22.

The square shafts 16 extend between the frame members 11 and 12 and rearwardly from the rear frame member 12 and are journalled at their front ends in the upper portion of the member 11 and intermediate their lengths in the member 12. These square shafts are ordinally arranged in spaced-apart and parallel relationship to each other. One such square shaft is assigned to each dial assembly of the machine register, as is well known to the art. The actuator shafts 18 extend between the frame members 11 and 12 and are journalled at their opposite ends in these frame members below, and parallel to, the portions of the square shafts 16 between the same frame members. There are usually approximately half as many actuator shafts as square shafts, with one actuator shaft disposed between each pair of adjacent square shafts and carrying two actuator drums, one of which operates the square shaft at the right-hand side, and the other of which operates the square shaft at the left-hand side of the actuator shaft. The main drive shaft 21 extends along the front side of the forwardly disposed frame member 11 and is journalled in bearings carried by this frame member. The main drive shaft is driven in successive cycles of one rotation each by the machine motor in a manner well known to the art.

The selection slides 15 are ordinally arranged in spaced-apart and parallel relationship to each other with their longitudinal center lines substantially parallel to the rotational axes of the square shafts 16 and extend forwardly and rearwardly of the transverse frame plate 11. Each of these selection slides is mounted for longitudinal movement on supporting links, as indicated at 24 and 25, the forwardly disposed link 24 being pivotally mounted at its bottom end on a transversely extending angle bar 26 carried by the machine frame, and being pivotally connected at its upper end to a corresponding selection slide 15 near the front end of the slide. The rearwardly disposed link 25 is pivotally mounted at its bottom end on an angle bar 27 extending transversely of, and supported by the machine frame, and is pivotally connected at its upper end to the corresponding selection slide 15 near the forward side of the transverse frame member 11, the links 24 and 25 supporting the corresponding selection slide 15 for longitudinal movement forwardly and rearwardly of the machine. Each selection slide is extended rearwardly of the plate 11 and carries at its rear end a depending fork 28 which is engaged in a groove in the selection gear 17 on the corresponding square shaft 16, so that longitudinal movement of the selection slide moves the selection gear 17 along the corresponding, stepped actuating drum 19 or 20 to position the selection gear to rotate the corresponding square shaft a number of angular units corresponding to the selected longitudinal position of the selection slide.

The keyboard 14 comprises a rectangular frame 30 disposed above, and parallel to, the selection slides 15 and a plurality of keys 31 carried by the frame 30. Each key 31 has a flat stem 32 extending slidably through the frame, and each stem carries near its lower end, a perpendicularly projecting pin 33, and on its upper end a key top, or head, 34. A spring 35 surrounds each key stem between the top of the frame 30 and the bottom end of the corresponding top 34 and resiliently urges the key to its normal, or raised, position.

The keys 31 are arranged in rows exending longitudinally of the keyboard with the rows ordinally arranged in spaced-apart and parallel relationship and with nine digit keys in each row progressively numbered from "1" to "9" from the front to the rear end of the keyboard. A "0" key 36 is mounted in the keyboard frame 30 at the front end of each digit key row and is effective to secure in latched-down position or to release a digit key in the corresponding key row in a manner well known to the art.

The selection slides are arranged in pairs, one pair extending along each key row with one slide at the right-hand side and the other slide at the left-hand side of the lower ends of the key stems of the particular row. In each pair of selection slides 15, the slide at the right-hand side of the lower end portions of the corresponding row of key stems is provided with a series of notches 38 in the top portion of the slide and with upwardly and forwardly inclined cam edges 39 disposed one at the forward side of each notch 38. The notches 38 are respectively disposed adjacent the lower ends of the stems of the "6" to "9" keys of the corresponding key row. The pins 33 carried by these key stems are engageable with the corresponding cam edges 39 to impart forward movements to the selection slide when the keys are depressed. The cam edges 39 have different angles of inclination so that the depression of each of the keys from "6" to "9" will move the selection slide forwardly a differential amount, thereby moving the corresponding selection gear 17 along the associated square shaft 16 a corresponding differential distance in order to bring it into mesh with a sector of the stepped actuating drum 19 having a number of teeth corresponding to the number of the depressed key, as is well known. The selection slide at the left-hand side of the key row is provided with notches similar to the notches 38 but disposed adjacent the lower ends of the stems of the "1" to "5" keys of the corresponding row. The inclined cam edges at the forward sides of these notches are such that depression of any one of the "1" to "5" keys will move the left-hand selection slide forwardly a corresponding amount and position the second selection gear 17 on the same square shaft 16 relative to the actuating drum 19 to turn the corresponding square shaft a number of angular increments corresponding to the number of the depressed keyboard key.

When a keyboard key is depressed, it is latched down by means well known to the art until the digitation cycle of the machine is completed, whereupon the depressed keys may be automatically released. Thus, when keys in different key rows have been depressed to select an entry value, and an operating cycle of the machine is established by depressing a control key, such as an addition or subtraction key, the selection slides 15 hold the corresponding selection gears 17 in position relative to the associated actuating drums 19 so that each square shaft will be turned a number of angular increments corresponding to the number of the digit key depressed in the corresponding key row. The register dials of the machine will be rotated correspondingly through the appropriate number of angular intervals to enter the value selected in the keyboard, into the machine register. At the end of such a digitation cycle, if the depressed keys are released, the selection slides are moved rearwardly to their full-cycle positions and the selection gears are moved out of mesh with the corresponding actuator drums.

In order to move each selection slide rearwardly to its home position in which the selection gear connected thereto is out of registry with the corresponding actuator drum, tension springs, as indicated at 42, are connected one to each selection slide 15 and to a transverse rod 43 and constantly urge the selection slides rearwardly, the slides being moved forwardly by depression of keyboard keys in the corresponding key rows.

Figures 4, 5:
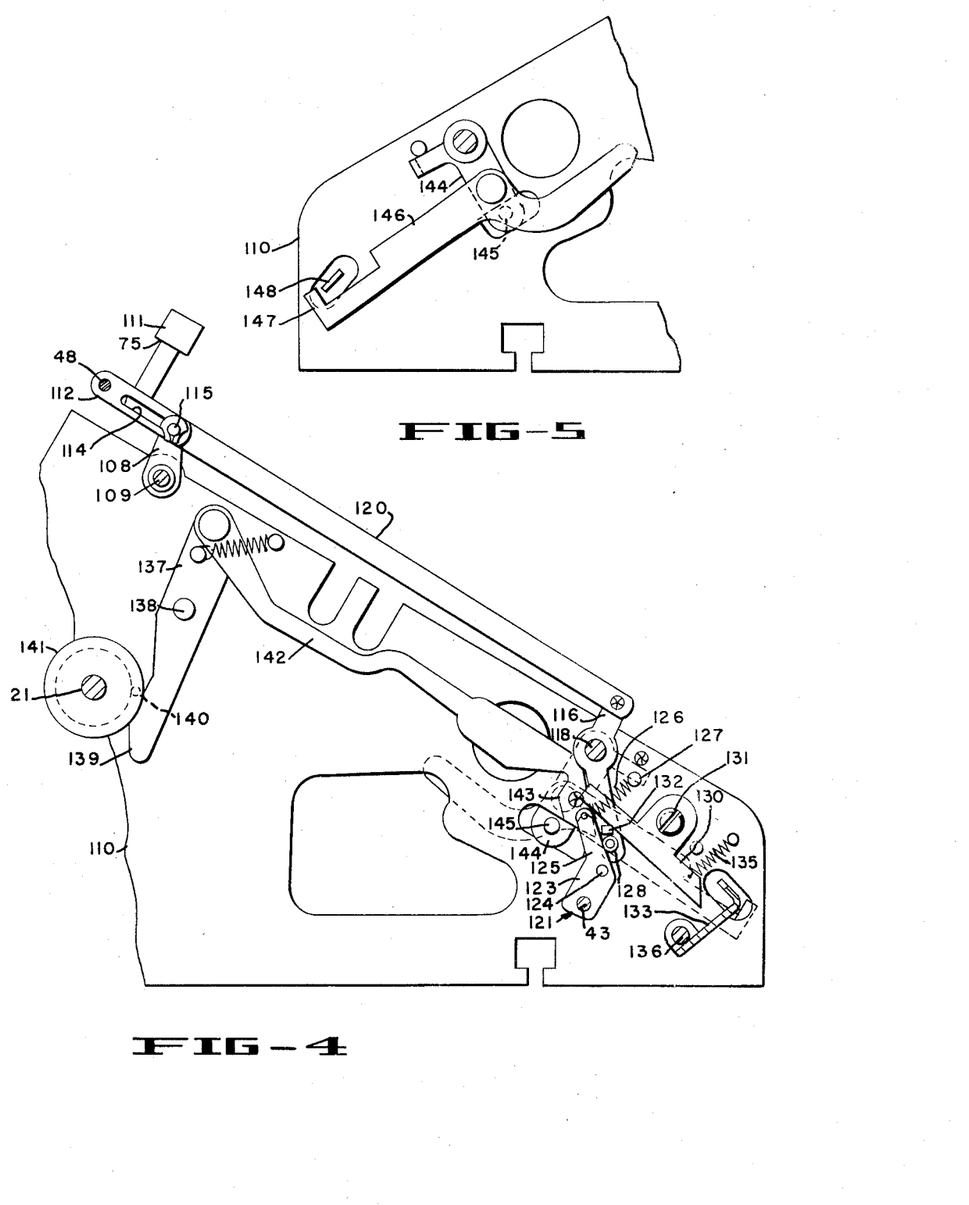
Fig. 4 is a fragmentary cross-sectional view of the clearing mechanism taken along the plane indicated by the line 4—4 of Fig. 1.
Fig. 5 is a fragmentary elevational view of the right side of part of the mechanism of Fig. 4, looking from the plane indicated by the line 5—5 of Fig 1.

Suitable mechanism for automatically releasing the keyboard keys at the end of a machine operating cycle is shown in Figs. 4 and 5 and includes a key-releasing bail 133 extending transversely of the machine frame in front of the keyboard and rockably mounted on a shaft 136. A lever 137 is pivotally mounted at 138 on the frame side plate 110 and has at one end a cam edge 139 engaged by a pin 140 carried by a disk 141 on the main drive shaft 21 of the machine to rock the lever 137 about the pivotal mounting 138 near the end of the machine cycle. A link 142 is pivotally connected at its rearward end to the other end of lever 137 and extends forwardly from this lever, being provided at its forward end with a downwardly open hook formation 143. An arm 144 is pivotally mounted at its upper end on frame plate 110 near the forward end of link 142 and carries near its lower end a pin 145 engageable by the hook formation 143, so that arm 144 may be rocked when lever 137 is rocked. A second link 146 is pivotally connected at one end to arm 144 and extends forwardly from this arm, being provided at its forward end with an upwardly formed hook formation 147 which is engageable with a tongue 148 projecting longitudinally from the right-hand end of bail 133 to rock this bail and release the depressed keyboard keys when lever 137 is rocked at the end of a machine operating cycle. The operation of the key releasing bail 133, by means of the linkage here described, is effective to release any key which has been latched in a fully depressed or operative position, as is described and shown in the patent above referred to.

From the above description it is apparent that a value, such as a constant factor value, could be set up in the selection slides without use of the keyboard keys if the slides could be resiliently moved forwardly and stopped at locations in which they would be differentially positioned in accordance with the selected value. The present invention involves the accomplishment of this result by means of a constant factor storage and re-entry mechanism now to be disclosed.

*Constant factor mechanism*

The constant factor storage and re-entry mechanism comprises an elongated frame, or cradle, generally indicated at 45, disposed in the space between the transverse frame member 10 and the rear side of the keyboard 14. This frame comprises a pair of end plates 46 and 47, which are disposed in substantial alignment with the left-hand and right-hand sides of the keyboard, respectively; and tie rods 48, 49 and 65, extending between, and secured to, the end plates 46 and 47 in spaced-apart and parallel relationship to each other.

Figure 1:
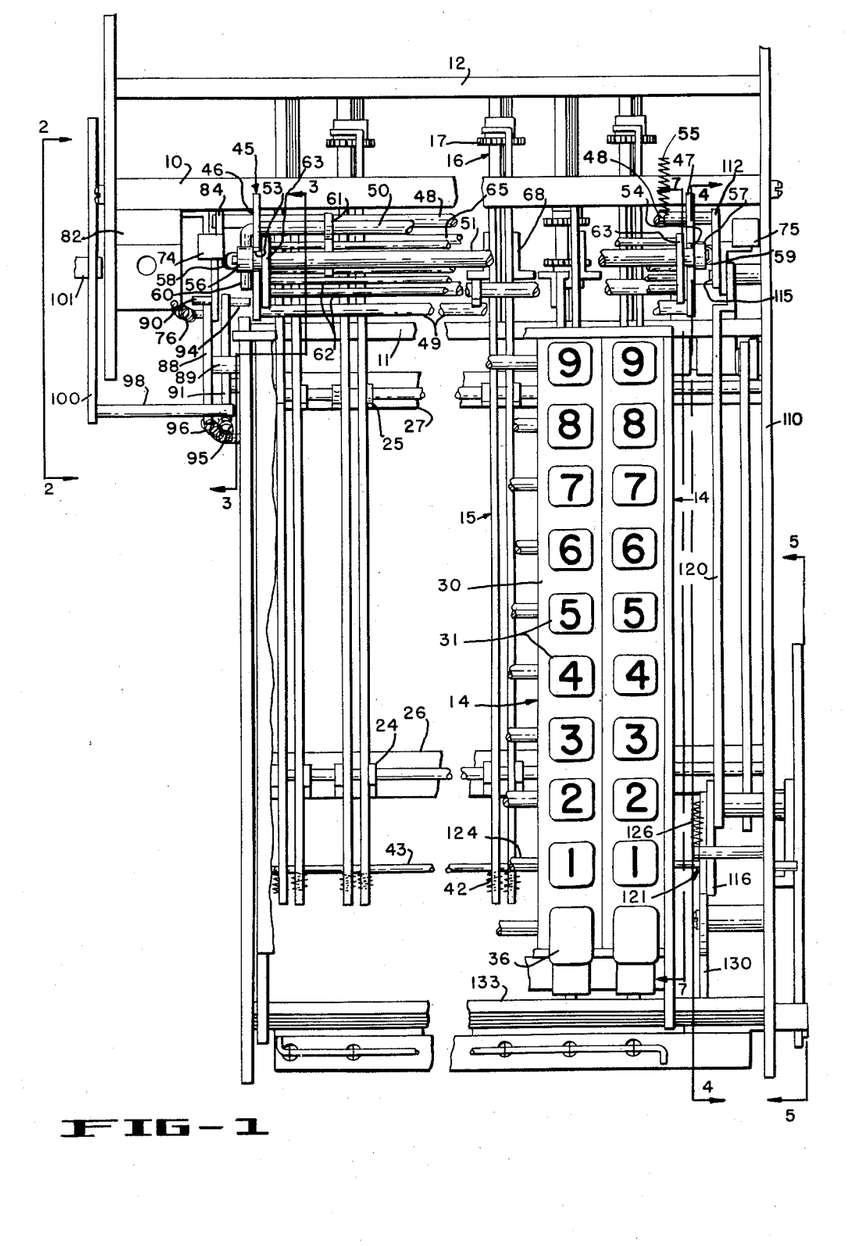
Fig. 1 is a fragmentary top plan view of a calculating machine with a constant factor storage mechanism illustrative of the invention installed therein.

The cradle also includes shafts 50, 51 and 52 extending between the end plates in parallel relationship to each other and to the tie rods. The tie rod 48 is secured at its ends to the end plates at the upper rear corners of the end plates when the cradle is operatively mounted in a calculating machine. The end plates 46 and 47 are provided with notches 53 and 54, respectively, Figs. 1 and 2, opening to the top edges of the end plates forwardly of the tie rod 48 and receiving the corresponding ends of the shaft 51. Guide spools 56 and 57 are secured, one on each end of shaft 51, and received in notches 53 and 54, respectively, to guide the ends of the shaft in the notches.

Tension springs 58 and 59 are connected between the end plates 46 and 47, respectively, below the notches 53 and 54 and to the corresponding ends of shaft 51 and resiliently urge the ends of the shaft inwardly of the notches and downwardly. Shaft 50 is located immediately to the rear of shaft 51 and is formed at its left-hand end with a forwardly extending crank arm 60, by means of which the shaft can be rocked in a manner to be later described. Lever arms 61 project radially from shaft 50 and under shaft 51 to raise shaft 51 against the force of springs 58 and 59 when shaft 50 is rocked in a counter-clockwise direction, as viewed in Fig. 2.

A lever locking grid is mounted on, and extends longitudinally of, shaft 51 below this shaft and comprises five elongated rods 62 held in spaced and parallel relationship to each other and to the shaft 51 by transverse plates 63 spaced-apart along shaft 51 and through which this shaft and the rods 62 extend.

A plurality of simple levers 64 are pivotally mounted intermediate their lengths in ordinal arrangement on shaft 52 and extend above and below this shaft, there being one lever 64 for each selection slide 15. Tension springs 66, connected one to each lever 64 below the shaft 52 and to the tie rod 65, resiliently rock the levers to the position shown in Fig. 7, in which the upper end portions of the levers rest against the tie rod 49. The levers have pointed, or beveled, upper ends disposed at the underside of the locking grid which are engageable between adjacent rods 62 to hold the levers in set angular positions on the shaft 52.

An angle bracket 68 is mounted on the rearward extension of each selection slide 15 in position to engage the lower end of the corresponding lever 64 when the levers are lowered to operative position. The cradle is rockably mounted on the transverse frame member 10 by pivotal connections 70 between brackets 71 mounted on frame member 10 and the end plates 46 and 47 at the rear lower corners of the end plates, so that the cradle can be rocked upwardly and downwardly to move the lower ends of levers 64 out of and into operative position relative to the abutment brackets 68 on the rearward extensions of the selection slides 15. The cradle is rocked down by manually operated keys 74 and 75 disposed, respectively at the left-hand end and the right-hand end of the cradle and is returned to its upper position by a tension spring 55 secured on shaft 48.

Key 74 at the left-hand end of the cradle 45 is used to rock the cradle down for entry of a constant factor in the constant factor mechanism. This key has a flat stem 77, pivoted at its lower end on a bracket 78 by a pivot 79, and carrying on its upper end, a key top 80. A pin 81 projects to the left from the front lower corner of the key stem 77. The spring 76 is connected at one end to pin 81 and at its other end to a bracket 82, the brackets 78 and 82 both being mounted on, and projecting forwardly from, the transverse frame member 10. A link 84, pivotally connected at its rear end to the left-hand end of the tie rod 48, is provided forwardly of this tie rod with a longitudinally extending slot 85 receiving a pin 86 carried by the key stem 77. The arrangement is such that when the key 74 is swung downwardly and forwardly about its mounting pivot 79, the cradle 45 is also swung forwardly and downwardly about the pivotal connections 70 against the force of spring 55, but the cradle can be rocked downwardly and forwardly without moving the key 74, as will later appear.

A latch lever 88, pivotally mounted intermediate its length on a fixed pivot 89, has at its rearward end a hook formation engageable with a latch pin 90 on key stem 77 to hold the key 74 and cradle 45 in rocked position against the force of spring 76. A second lever 91, mounted intermediate its length on a fixed pivot 92, bears at its rearward end upon a stud 93 carried by the key stem 77 eccentrically of the pivot 79 and has a pin 94 projecting to the right from its rearward end. A spring 95 urges lever 91 in a clockwise direction, as viewed in Fig. 3. The arrangement is such that when key 74 is rocked downwardly and forwardly, stud 93 is lowered, permitting pin 94 to pass under the forward end of crank arm 60 and rock shaft 50 in a direction and to an extent to hold the locking grid above the upper, pointed ends of levers 64.

Figure 8:
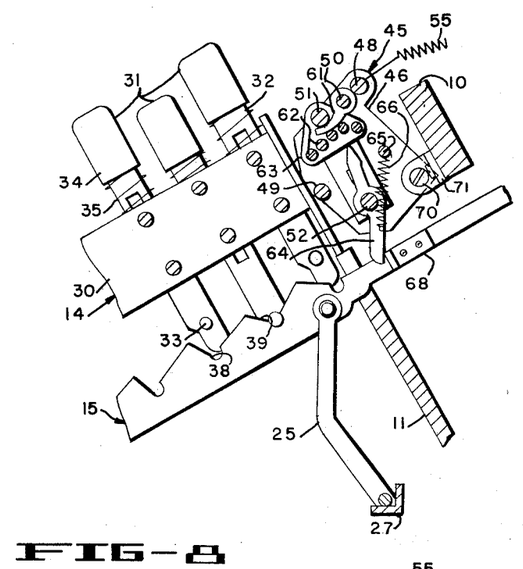
Figs. 8, 9 and 10 are fragmentary cross-sectional views similar to Fig. 7 but showing the parts in different operative positions.

As the levers 64 are now free, except for the springs 66, and the lower ends of these levers are in opposition to the corresponding abutment brackets 68, as shown in Fig. 8, a value may now be entered in the keyboard and the consequent movement of the selection slides will move the levers 64 to corresponding angularly set positions about the shaft 52.

Figures 2, 3:
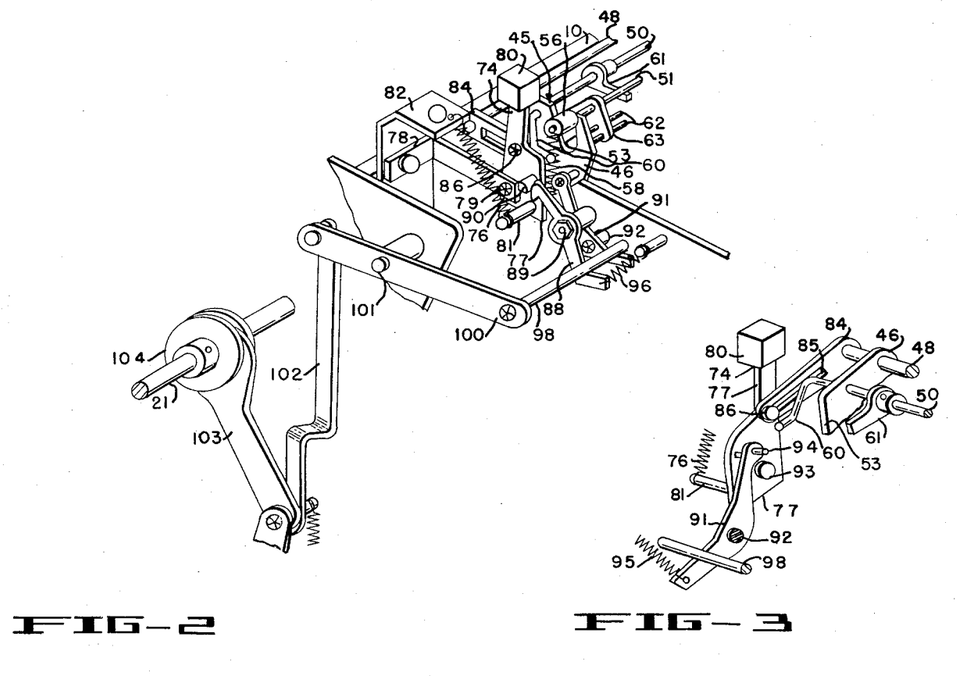
Fig. 2 is a fragmentary perspective view of the left end of the constant factor storage mechanism and associated parts of the calculating machine, taken on the plane indicated by the line 2—2 of Fig. 1.
Fig. 3 is a perspective view of the right side of a portion of the constant factor storage mechanism shown in Fig. 2, taken along the plane indicated by the line 3—3 of Fig. 1.

Latch lever 88, Fig. 2, has a tail portion extending forwardly from pivot 89, and a spring 96 connected to this tail portion urges the latch lever 88 to latching position. The lever 91 also has a forwardly extending tail portion, and a pin 98 projecting from one end of a lever 100 overlies the forwardly extending tail portions of the lever 88 and 91. Lever 100 is pivotally mounted intermediate its length on a fixed pivot 101. A link 102 connects the end of lever 100 remote from pin 98 to the distal end of an arm 103, mounted at its other end on an eccentric cam 104 on the main drive shaft 21 of the machine.

If, after the value hase been set in the keyboard and the levers 64 differentially set, as described above, a control key of the machine is operated to rotate the main drive shaft 21, the arm 103 will be moved by the cam 104 and will act, through the link 102, to rock the lever 100 in a direction to move the pin 98 downwardly. The tail portion of lever 91 is at a higher lever than the tail portion of lever 88, so that downward movement of pin 98 first rocks lever 91 to move pin 94 from beneath the distal end portion of crank arm 60, thereby releasing the locking grid for downward movement by the springs 58 and 59. When the grid is moved downwardly, the rods 62 engage the beveled upper ends of the levers 64 and locks these levers in the angular positions to which they have been moved by the abutment brackets 68 on the selection slides 15.

Immediately after the locking grid has been released to lock the levers 64 in set position, the pin 98 engages the tail portion of latch lever 88 and releases the hook formation on this lever from the pin 90 on the key stem 77. The spring 55 then acts to return the cradle to its usual upper position and thereby raise the lower ends of levers 64 above the abutment brackets 68. The constant factor mechanism is thus returned to inoperative position with the constant factor value locked in it.

Figure 6:
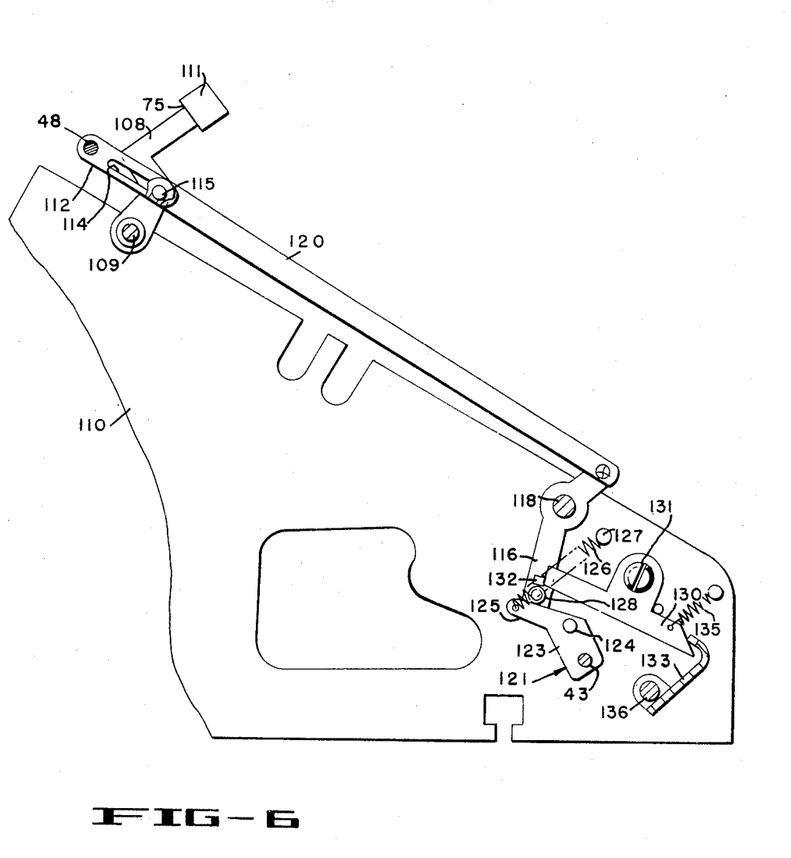
Fig. 6 is a view similar to Fig. 4, but showing the parts in a different operative position from that illustrated in Fig. 4.

When it is desired to re-enter the constant factor value into the selection slides of the machine, the key 75, Figs. 4 and 6, at the right-hand end of the constant factor storage and re-entry mechanism is swung forwardly and downwardly. This key has a flat stem 108 pivoted at its lower end on a fixed pivot 109 carried by the right-hand frame plate 110 of the machine, and has a key top 111 on the free upper end of the stem. A short link 112 has, at its rear end, an aperture receiving the right-hand end of tie rod 48, and has near its front end, a longitudinally extending slot 114 receiving a pin 115 carried by the key stem 108 above the pivotal mounting 109. With this arrangement, when key 75 is moved downwardly and forwardly, it acts through the link 112 to swing the cradle, or frame, 45 downwardly and forwardly to bring the lower ends of levers 64 into position of opposition to the abutment brackets 68. When cradle 45 is rocked downwardly by key 75, key 74 is not moved because of slot 85 in link 84 and, conversely, when the cradle is rocked downwardly by key 74, key 75 is not moved because of the slot 114 in link 112.

A lever 116 is pivotally mounted on frame plate 110, forwardly of key 75, by a pivotal mounting 118, and a link 120, longer than the link 112, connects the key stem 108 to the upper end of lever 116. A bail, generally indicated at 121, extends between the right-hand and left-hand frame plates of the machine near the front ends of these frame plates and includes bail legs 122 and 123, Figs. 7 and 4 or 6, disposed one at each end of the bail. The bail 121 is secured to the left and right side frames by suitable pivot means, such as shown at 124, disposed one at each end of the bail. The rod 43 extends between, and is secured at its ends to, the bail legs near the free, lower ends of the bail 121.

Figure 7:
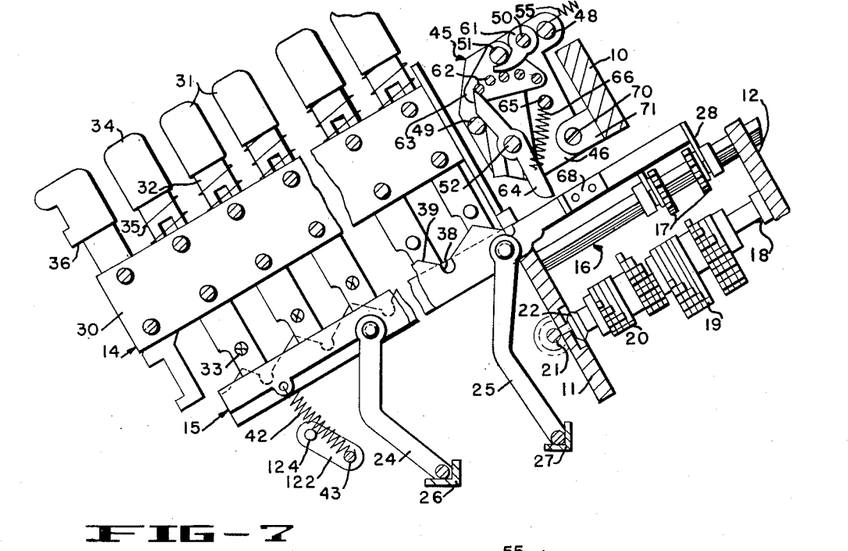
Fig. 7 is a fragmentary cross-sectional view of the selection and storage mechanisms taken from the plane indicated by the line 7—7 of Fig. 1.
Figure 9:
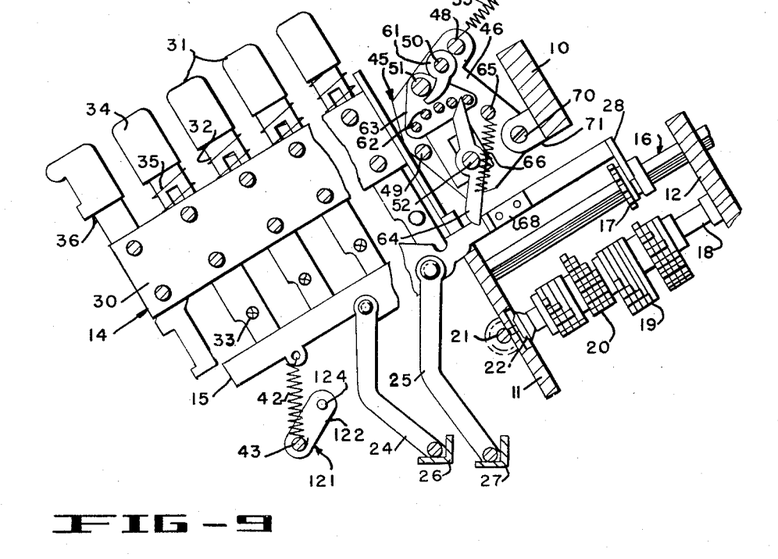

As explained above, the springs 42 are secured at their lower ends to the cross rod 43 of the bail 121. The bail has two operative positions, one position in which the springs 42 are positioned to urge the selection slides 15 rearwardly, as shown in Fig. 7, and the other position in which the springs are positioned to urge the selection slides forwardly, as shown in Fig. 9. The right-hand bail leg 123 is formed as, or is connected to, a bellcrank lever having an arm 125 extending upwardly and rearwardly from the pivot rod 124. A spring 126, connected between the distal end of arm 125 and an anchor pin 127 mounted on frame plate 110 above bail 121, resiliently urges the bail to the normal position thereof in which the springs 42 exert a rearwardly directed force on the selection slides 15, as shown in Fig. 7.

A pin-carried roller 128 on the lower end of lever 116 engages the upper edge of bellcrank lever arm 125. When key 75 is moved forwardly, swinging lever 116 in a clockwise direction, as viewed in Fig. 6, this roller rides along the upper edge of arm 125 and swings bail 121 to its other operative position, as shown in Fig. 9, in which springs 42 exert a forwardly directed force on selection slides 15. The arrangement is such that, when the constant factor mechanism is rocked by forward movement of key 75 from the position shown in Fig. 10 to that shown in Fig. 9, the lower ends of levers 64 are moved into opposition to the abutment brackets 68 before the bail 121 has been rocked sufficiently for springs 42 to urge selection slides 15 forwardly. When the stroke of key 75 is completed and bail 121 is rocked to its operative position in which springs 42 urge the selection slides forwardly, the slides move forwardly until the abutment brackets 68 thereon engage the lower ends of the corresponding levers 64 and the constant factor value is then re-entered in the selection slides for transmission to the machine register upon the next operative cycle of the machine.

A latch bar 130, Figs. 4 and 6, is pivotally mounted intermediate its length on a fixed pivotal mounting 131 carried by the frame plate 110 and has its rearward end disposed in opposition to a stud 132 carried by the lever 116 adjacent the roller 128, and its forward end beveled and disposed in opposition to the keyboard clear bail 133 of the machine. A spring 135 urges the latch lever 130 to move in a counter-clockwise direction, as viewed in Fig. 6, to engage the rearward end of the latch lever against stud 132 when lever 116 is rocked in a clockwise direction, as explained above, and thus latch the constant factor mechanism in its downwardly rocked position.

Figure 10:
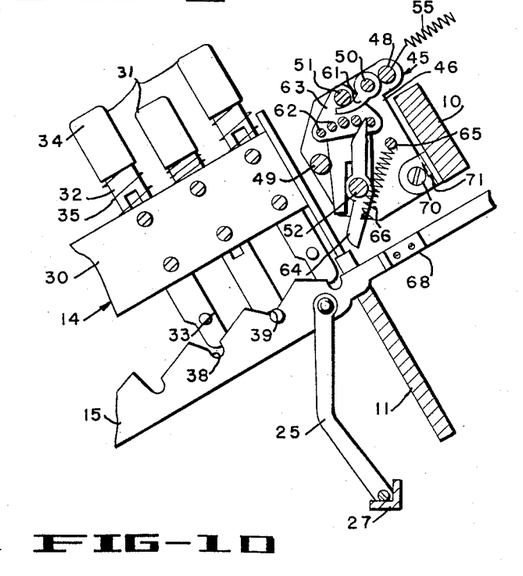

When the machine is cycled after the constant factor value has been re-entered in the selection slides, as described above, the value entered in the slides is transmitted to the machine register and the lever 116 may be automatically released for return of the constant factor storage and re-entry mechanism to its inoperative position by spring 55. While various means may be provided for releasing the latch lever 130 from stud 132, it has been found convenient to accomplish this release, or unlatching, by positioning the beveled front end of the latch lever 130 so that it will be struck by the keyboard release bail 133 when this bail is rocked. This bail is rocked by a conventional "add key" mechanism near the end of the cycle to release the keyboard keys that have been depressed. When the front end of lever 130 is struck by bail 133, the lever is rocked to remove its rear end from stud 132 thereby releasing key 75 and cradle 45 for return to the inoperative position of the constant factor mechanism by spring 55, as shown in Fig. 10.

Since key 74 was not moved when the cradle was swung down by key 75, stud 93 and the rear end of lever 91 were not lowered and the distal end of the crank arm 60 thus passed under pin 94 on lever 91. Thus, when pin 98 is moved down during the cycle-following movement of key 75, shaft 50 is not rocked to raise the locking grid and release the levers 64.

The constant factor value thus remains locked in the constant factor mechanism until the key 74 is operated to store a new factor in the mechanism. When key 74 is moved forwardly, the stud 93 is lowered, lowering the rear end of lever 91 sufficiently for the distal end of crank arm 60 to ride onto pin 94 during the first part of the downward and forward movement of cradle 45. During the remainder of the movement of the cradle by the key 74, the locking grid is raised to free the levers 64, as shown in Fig. 8. During the subsequent machine operation cycle, the grid is released to lock the levers 64 and the cradle is returned to the inoperative position of the constant factor mechanism, as shown in Fig. 7, and described above, unless a value was inserted into the keyboard subsequent to the operation of key 74. In the latter case the new factor is stored in the constant factor mechanism, as shown in Fig. 10 and described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a calculating machine having actuating mechanism including ordinally arranged stepped actuating drums, and selection mechanism including ordinally arranged selection slides longitudinally movable to predetermined positions, selection gears movable by said selection slides along corresponding actuating drums and a keyboard including a frame disposed above said selection slides and keys slidably mounted in said frame and engageable with said selection slides to move the latter to said predetermined positions, constant factor storage mechanism comprising a frame extending across said selection slides, levers pivotally mounted in said frame one adjacent each selection slide, abutment means on the selection slides engageable with the corresponding levers to set the levers in accordance with a keyboard setting of the selection slides, means effective to lock said levers in set condition and thus render the levers effective to reset the selection slides to the same setting as that used to position the levers, resilient means connected to said selection slides for individually urging longitudinal movement of the slides, and means rendering said resilient means effective to urge said selection slides in a direction to bring the slide-carried abutment means against the corresponding levers.

2. In a calculating machine having selection mechanism including ordinally arranged and longitudinally movable selection slides, resilient means individually urging movement of said slides in one direction, and a keyboard including a frame and keys movably mounted in said frame and engaging said selection slides to move the latter to selected positions against the force of said resilient means, constant factor storage mechanism comprising abutment means on said selection slides, stop members movably mounted one adjacent each selection slide and engageable by the corresponding abutment means to move said stop members to set positions corresponding to the key set positions of said selection slides, means releasably locking said stop members in set position, and means connected to said resilient means and operative to render said resilient means effective to urge said selection slides in an opposite direction to bring said abutment means against the corresponding stop members to thereby reset said selection slides to the same setting used to position said stop members.

3. In a calculating machine having a frame and selection mechanism including ordinally arranged and longitudinally movable selection slides, resilient means individually urging said selection slides in one direction of longitudinal movement, and a keyboard including a frame and keys movably mounted in said frame and engaging said selection slides to move the latter to selected positions against the force of said resilient means, constant factor storage mechanism comprising a cradle rockably mounted on said machine frame and extending across said selection slides, abutment means carried by said selection slides, stop members movably mounted in said cradle and engageable when said cradle is in one position relative to said frame with the corresponding abutment means for movement of said stop members to set positions corresponding to the key selected positions of the corresponding selection slides, a grid movably mounted in said cradle and engageable when in one position relative to said cradle to lock said stop members in their set positions and render them effective to reset said selection slides to the same positions as those used to set said stop members, first manually operated means carried by said cradle and effective to move said grid means into and out of locking engagement with said stop members, second manually operated means connected to said cradle and operative to rock said cradle relative to said machine frame to move said stop members into and out of position for engagement by said abutment means, and means connecting said second manually operated means to said resilient means and operative when said cradle is rocked by said second manually operated means to position said stop members for engagement by said abutment means to condition said resilient means to urge said selection slides in a direction to engage said abutment means with the corresponding stop members.

4. In a calculating machine having a frame and selection mechanism including ordinally arranged selection slides and a keyboard including a frame and keys movably mounted in said frame and engageable with said selection slides to move the latter to selected positions, constant factor storage mechanism comprising a cradle rockably mounted on said machine frame and extending across said selection slides, abutment means carried individually by said selection slides, stop members movably mounted in said cradle and engageable when said cradle is in one predetermined position by said abutment means for movement of said stop members to positions corresponding to the key set positions of the corresponding selection slides, springs individually urging said stop members in the direction opposite to that in which they are moved by said abutment means, a grid structure movably mounted in said cradle and engageable when in one position relative to said cradle with said stop members to releasably lock said stop members in set positions to render said stop members effective to reset said selection slides to the same positions used for setting said stop members, first manually operated means carried by said cradle and effective to move said grid structure into and out of engagement with said stop members, second manually operated means connected to said cradle and effective to move said stop members into and out of position for engagement by said abutment means, and resilient means connected to said selection bars and conditioned by said second manually operated means when moved to position said stop members for engagement by said abutment means to urge said selection slides in a direction to engage said abutment means with said stop members.

5. In a calculating machine having a frame, ordinally arranged selection slides mounted in said frame, resilient means normally urging said selection slides in one direction of longitudinal movement, and selection means effective to move said selection slides to differentially set positions against the force of said resilient means, constant factor storage and re-entry mechanism comprising a cradle rockably mounted on said frame and extending across said selection slides, ordinally arranged stop levers pivotally mounted in said cradle, locking means movably mounted in said cradle for movement into and out of locking engagement with said stop levers, abutment means on said selection slides individually engageable with said stop levers, retracting means urging said cradle to a position at which said abutment means are out of engagement with said stop levers, first manually operated means effective to rock said cradle into position for engagement of said abutment means with said stop levers to move said stop levers to differentially set positions corresponding to the positions to which said selection slides are differentially set by said selection means, means conditioned by said first manual means and actuated by the associated calculating machine during a machine operating cycle following a differential setting of said stop levers to effect movement of said locking means into engagement with said stop levers and effect movement of said cradle to move said stop levers out of position for engagement by said abutment means, second manual means effective to move said cradle for return of said stop levers to position for engagement by said abutment means, means actuated by said second manual means to modify the force exerted on said selection slides by said resilient means to resiliently move said selection slides to bring said abutment means into engagement with the corresponding stop levers and thereby reset said selection slides to the same differential positions as that which existed at the time said stop levers were locked in differentially set positions, and means conditioned by operation of said second manual means and actuated by the associated calculating machine during a machine operating cycle following the resetting of said selection slides to effect return of said cradle to said position in which said abutment means are out of engagement with said stop levers.

6. In a calculating machine having a frame, ordinally arranged selection slides mounted in said frame, resilient means normally urging said selection slides in one direction of longitudinal movement, and selection means effective to move said selection slides to differentially set positions against the force of said resilient means, constant factor storage and re-entry mechanism comprising a cradle rockably mounted on said frame and extending across said selection slides, ordinally arranged stop levers pivotally mounted in said cradle, locking means movably mounted in said cradle for movement into and out of locking engagement with said stop levers, abutment means on said selection slides individually engageable with said stop levers, retracting means urging said cradle to a position at which said abutment means are out of engagement with said stop levers, first manually operated means effective to rock said cradle into position for engagement of said abutment means with said stop levers to move said stop levers to differentially set positions corresponding to the positions to which said selection slides are differentially set by said selection means and to simultaneously release said stop levers from said locking means, means conditioned by said first manual means and actuated by the associated calculating machine during a machine operating cycle following a differential setting of said stop levers to effect movement of said locking means into engagement with said stop levers and effect movement of said cradle to move said stop levers out of position for engagement by said abutment means, second manual means effective to move said cradle for return of said stop levers to position for engagement by said abutment means, means actuated by said second manual means to modify the force exerted on said selection slides by said resilient means to resiliently move said selection slides to bring said abutment means into engagement with the corresponding stop levers and thereby reset said selection slides to the same differential positions as that which existed at the time said stop levers were locked in differentially set positions, and means conditioned by operation of said second manual means and actuated by the associated calculating machine during a machine operating cycle following the resetting of said selection slides to effect return of said cradle to said position in which said abutment means are out of engagement with said stop levers.

7. In a calculating machine having a frame, ordinally arranged selection slides mounted in said frame, resilient means normally urging said selection slides in one direction of longitudinal movement, and selection means effective to move said selection slides to differentially set positions against the force of said resilient means, constant factor storage and re-entry mechanism comprising a support movably mounted on said frame and extending across said selection slides, ordinally arranged stop elements carried by said support, locking means carried by said support for movement into and out of locking engagement with said stop elements, abutment means on said selection slides individually engageable with said stop elements, retracting means urging said support to a position at which said abutment means are out of engagement with said stop elements, first manually operated means effective to move said support into position for engagement of said abutment means with said stop elements to move said stop elements to differentially set positions corresponding to the positions to which said selection slides are differentially set by said selection means, means conditioned by said first manual means and actuated by the associated calculating machine during a machine operating cycle following a differential setting of said stop elements to effect movement of said locking means into engagement with said stop elements and effect movement of said support to move said stop elements out of position for engagement by said abutment means, second manual means effective to move said support for return of said stop elements to position for engagement by said abutment means, means actuated by said second manual means to modify the force exerted on said selection slides by said resilient means to resiliently move said selection slides to bring said abutment means into engagement with the corresponding stop elements and thereby reset said selection slides to the same differential positions as that which existed at the time said stop elements were locked in differentially set positions, and means conditioned by operation of said second manual means and actuated by the associated calculating machine during a machine operating cycle following the resetting of said selection slides to effect return of said support to said position in which said abutment means are out of engagement with said stop elements.

8. In a calculating machine having a frame, ordinally arranged selection slides mounted in said frame, resilient means normally urging said selection slides in one direction of longitudinal movement, and selection means effective to move said selection slides to differentially set positions against the force of said resilient means, constant factor storage and re-entry mechanism comprising a support mounted on said frame and extending across said selection slides, ordinally arranged stop elements carried by said support, locking means carried by said support for movement into and out of locking engagement with said stop elements, abutment means on said selection slides individually engageable with said stop elements, retracting means urging said stop elements to a position at which said abutment means are out of engagement with said stop elements, first manually operated means effective to move said stop elements into position for engagement by said abutment means to differentially set said stop elements to positions corresponding to the positions to which said selection slides are differentially set by said selection means, means effective to move said locking means into engagement with said stop elements and effect movement of said stop elements out of position for engagement by said abutment means, second manual means effective to move said stop elements to position for engagement by said abutment means, means actuated by said second manual means to modify the force exerted on said selection slides by said resilient means to resiliently move said selection slides to bring said abutment means into engagement with the corresponding stop elements and thereby reset said selection slides to the same differential positions as that which existed at the time said stop elements were locked in differentially set positions, and means effective to return said stop elements to said position in which said abutment means are out of engagement with said stop elements.

9. In a calculating machine having selection mechanism including ordinally arranged selection members movable to differentially set positions, resilient means individually urging movement of said members in one direction, and manual means for differentially positioning said selection members against the force of their respective resilient means, constant factor storage mechanism comprising abutment means on said selection members, a stop member movably mounted adjacent each selection member and engageable by the corresponding abutment means to move said stop members to set positions corresponding to the manually set positions of said selection members, means releasably locking said stop members in set position, and means connected to said resilient means and effective to urge said selection members in an opposite direction to move them to differentially set positions in which said abutment means are moved against the corresponding stop members, and thereby reset said selection members to the same differentially set positions used to position said stop members.

10. In a calculating machine having selection mechanism including a keyboard and longitudinal operable selection members operated by said keyboard, an adjustable resilient means normally opposing movement of said selection members by said keyboard, and a transverse frame member spaced rearwardly from the rear side of the keyboard, a constant factor storage mechanism disposed in the space between the rear side of the keyboard and the transverse frame member comprising an elongated cradle rockably mounted on said transverse frame member, settable levers carried in ordinal arrangement by said cradle and when the cradle is rocked to one position to be engaged by said selection mechanism in a manner to enable said levers to be differentially positioned corresponding to a keyboard value, means for adjusting said resilient means to bias said selection members in the opposite direction, locking means carried by said cradle for releasably locking said levers in set position, and manual control means connected to said cradle for optionally rocking said cradle to enable said settable storage levers to engage their respective selection members and thereby receive a keyboard value from said selection mechanism, and a second control means for optionally rocking said cradle to enable said settable storage levers to engage their respective selection members and operate said means for adjusting said resilient means and thereby move said selection members into engagement with said settable levers to set said stored keyboard value into said selection mechanism.

References Cited in the file of this patent

UNITED STATES PATENTS

| 1,120,746 | Rinsche | Dec. 15, 1914 |
| 2,325,388 | Friden | July 27, 1943 |
| 2,399,170 | Chase | Apr. 30, 1946 |
| 2,678,162 | Hutton | May 11, 1954 |

FOREIGN PATENTS

| 218,923 | Switzerland | Sept. 16, 1947 |